(12) United States Patent
Nelson et al.

(10) Patent No.: US 9,558,070 B2
(45) Date of Patent: *Jan. 31, 2017

(54) MAINTAINING HIGH AVAILABILITY OF A GROUP OF VIRTUAL MACHINES USING HEARTBEAT MESSAGES

(71) Applicant: VMware, Inc., Palo Alto, CA (US)

(72) Inventors: Michael Nelson, Alamo, CA (US); Keith Farkas, San Carlos, CA (US); Elisha Ziskind, Sharon, MA (US); Sridhar Rajagopal, Mountain View, CA (US); Guoqiang Shu, San Jose, CA (US); Ron Passerini, Somerville, MA (US); Joanne Ren, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/561,672

(22) Filed: Dec. 5, 2014

(65) Prior Publication Data

US 2015/0089272 A1    Mar. 26, 2015

Related U.S. Application Data

(63) Continuation of application No. 13/096,188, filed on Apr. 28, 2011, now Pat. No. 8,924,967.

(51) Int. Cl.
*G06F 15/173* (2006.01)
*G06F 9/455* (2006.01)
(Continued)

(52) U.S. Cl.
CPC ....... *G06F 11/1438* (2013.01); *G06F 9/45533* (2013.01); *G06F 9/542* (2013.01); *G06F 11/0757* (2013.01)

(58) Field of Classification Search
None
See application file for complete search history.

(56) References Cited

U.S. PATENT DOCUMENTS 6,243,825 B1    6/2001    Gamache et al.
7,124,264 B2    10/2006   Yamashita
(Continued)

OTHER PUBLICATIONS

"Using Microsoft Virtual Sen/er 2005 to Create and Configure a Two-Node Microsoft Windows Sen/er 2003 Cluster" Microsoft Tech Net, http://www.microsoft.eom/technetlprodtechnollvirtualsen/er/deploy/cvs2005.mspx#ERAA, © 2006 Microsoft Corporation, 55 pages, Sep. 2006.

(Continued)

*Primary Examiner* — Lewis A Bullock, Jr.
*Assistant Examiner* — Melissa Alfred

(57) ABSTRACT

Embodiments maintain high availability of software application instances in a fault domain. Subordinate hosts are monitored by a master host. The subordinate hosts publish heartbeats via a network and datastores. Based at least in part on the published heartbeats, the master host determines the status of each subordinate host, distinguishing between subordinate hosts that are entirely inoperative and subordinate hosts that are operative but partitioned (e.g., unreachable via the network). The master host may restart software application instances, such as virtual machines, that are executed by inoperative subordinate hosts or that cease executing on partitioned subordinate hosts.

24 Claims, 8 Drawing Sheets

(51) Int. Cl.
*G06F 9/46* (2006.01)
*G06F 11/00* (2006.01)
*G06F 11/14* (2006.01)
*G06F 9/54* (2006.01)
*G06F 11/07* (2006.01)

(56) References Cited

U.S. PATENT DOCUMENTS

| | | | |
|---|---|---|---|
| 7,203,944 B1 | 4/2007 | van Rietschote et al. | |
| 7,213,246 B1* | 5/2007 | van Rietschote | G06F 11/1482 707/999.202 |
| 7,257,811 B2 | 8/2007 | Hunt et al. | |
| 7,313,793 B2 | 12/2007 | Traut et al. | |
| 7,480,773 B1 | 1/2009 | Reed | |
| 7,533,229 B1 | 5/2009 | van Rietschote | |
| 7,603,670 B1 | 10/2009 | van Rietschote | |
| 7,644,317 B1 | 1/2010 | Sajassi et al. | |
| 8,510,590 B2 | 8/2013 | Ji et al. | |
| 2003/0018927 A1* | 1/2003 | Gadir | G06F 11/2005 714/4.11 |
| 2005/0148891 A1 | 7/2005 | Yamashita | |
| 2007/0043860 A1 | 2/2007 | Pabari | |
| 2008/0155169 A1 | 6/2008 | Hiltgen et al. | |
| 2008/0155208 A1 | 6/2008 | Hiltgen et al. | |
| 2008/0155223 A1 | 6/2008 | Hiltgen et al. | |
| 2008/0189468 A1 | 8/2008 | Schmidt et al. | |
| 2008/0189700 A1 | 8/2008 | Schmidt et al. | |
| 2010/0070784 A1 | 3/2010 | Gupta et al. | |
| 2011/0185258 A1* | 7/2011 | Grube | H04L 67/1097 714/763 |
| 2012/0117241 A1 | 5/2012 | Witt et al. | |
| 2012/0137293 A1 | 5/2012 | Bozek et al. | |

OTHER PUBLICATIONS

"Basics of Failover Management in Application Clustering Packages", VERITAS Architect Network, Jul. 7, 2003, © 2006 Symantec Corporation, http:/lwww.veritas.com/van/arlicles/3245.jsp, 11 pages.

Khalil, M. & Slovick, B., "ESX Server Storage II Tips and Tricks Raw Disk Mapping," Presentation, VMworld2005 Virtualize Now, Las Vegas, Oct. 2005, © 2005 VMware, Inc. Palo Alto, CA, 49 pages.

Rajagopal, S., "PAC177 Distributed Availability Service (DAS) Architecture," Presentation Oct. 2005, VMworld2005 Virtualize Now, Las Vegas, Oct. 18-20, 2005, © 2005 VMware, Inc. Palo Alto, CA, 41 Pages.

Stockman, M. etal., "Centrally-stored and delivered virtual machines in the networking/system administration lab," SIGITE Newsletter vol. 2, Issue 2 (Jun. 2005), ACM Press New York, NY, USA, pp. 4-6.

Vaghani, S., "PAC267-C ESX Server Storage Internals," Presentation Oct. 19, 2005, VMworld2005 Virtualize Now, Las Vegas, Oct. 2005, © 2005 VMware, Inc. Palo Alto, CA, 28 pages.

* cited by examiner

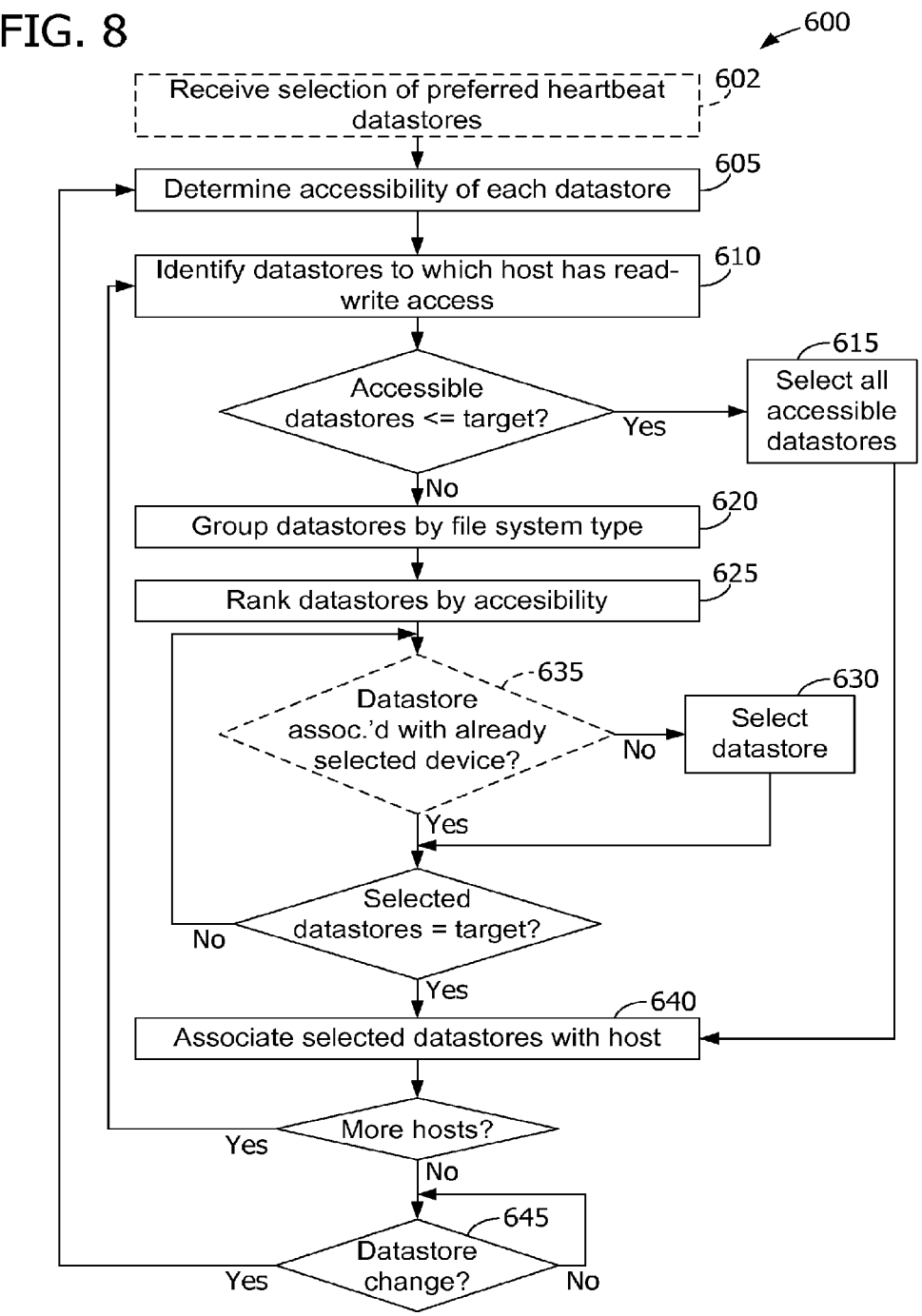

MAINTAINING HIGH AVAILABILITY OF A GROUP OF VIRTUAL MACHINES USING HEARTBEAT MESSAGES

CROSS REFERENCE TO RELATED APPLICATIONS

This application is a continuation of application Ser. No. 13/096,188, filed on Apr. 28, 2011, and entitled "Maintaining High Availability of a Group of Virtual Machines Using Heartbeat Messages," now issued as U.S. Pat. No. 8,924,967 which is incorporated herein by reference in its entirety.

BACKGROUND

Software applications, such as virtual machines, may be executed by a group or "cluster" of host computing devices. A master host may monitor execution of the software applications by subordinate hosts and restart a software application associated with an inoperable or unresponsive subordinate host.

SUMMARY

One or more embodiments described herein monitor subordinate hosts using a master host. The subordinate hosts transmit heartbeat messages via a network and store heartbeat data in heartbeat datastores. Subordinate hosts are associated with heartbeat datastores based on factors such as the quantity of hosts that have access to each heartbeat datastore, whether the heartbeat datastore is associated with the same storage device as another heartbeat datastore, the file system type of the heartbeat datastore, and/or user preferences.

Based at least in part on the transmitted heartbeat messages and the stored heartbeat data, the master host determines the status of each subordinate host, distinguishing between subordinate hosts that are entirely inoperative or "dead" and subordinate hosts that are operative but partitioned (e.g., unreachable via the network). The master host may restart software application instances, such as virtual machines, that are executed by inoperative subordinate hosts or that cease executing on partitioned subordinate hosts.

BRIEF DESCRIPTION OF THE DRAWINGS

FIG. 8 is a flowchart of an exemplary method performed by a management server, such as the management server shown in FIG. 3.

DETAILED DESCRIPTION

Embodiments provided herein maintain high availability of software application instances, such as virtual machines, by monitoring heartbeats published by computing devices hosting such software application instances via both a packet network and a shared datastore. In exemplary embodiments, a master host determines that a subordinate host is unreachable when heartbeat messages are not received from the subordinate host by the packet network. The master host is able to determine whether the unreachable host is dead or merely partitioned from the master host due to a communication failure.

To maintain availability of software application instances, the master host may restart all application instances that were executed by a dead host by directing one or more other subordinate hosts to execute these application instances and/or by executing these application instances itself. Similarly, the master host may monitor a "power-on" list of executing application instances maintained by a partitioned host and, when an application instance is removed from the power-on list, direct another subordinate host to execute the application instance.

In some embodiments, the term "host" refers to a computing device that executes one or more software application instances. A software application instance may include, for example, a virtual machine (VM), an instance of a server application (e.g., a web server or an application server), and/or an instance of a data processing application (e.g., a distributed computing client). Hosts may be organized as a fault domain, a group of hosts that collectively execute a set of software application instances. The software application instances may be associated with (e.g., stored in) one or more datastores, such that a software application instance may be migrated to or restarted at any host in the fault domain with access to the datastore that corresponds to the software application instance. The operation of a fault domain as described herein facilitates maintaining high availability of software application instances by automatically detecting inadvertently terminated application instances and restarting these application instances within the fault domain.

Figure 1:
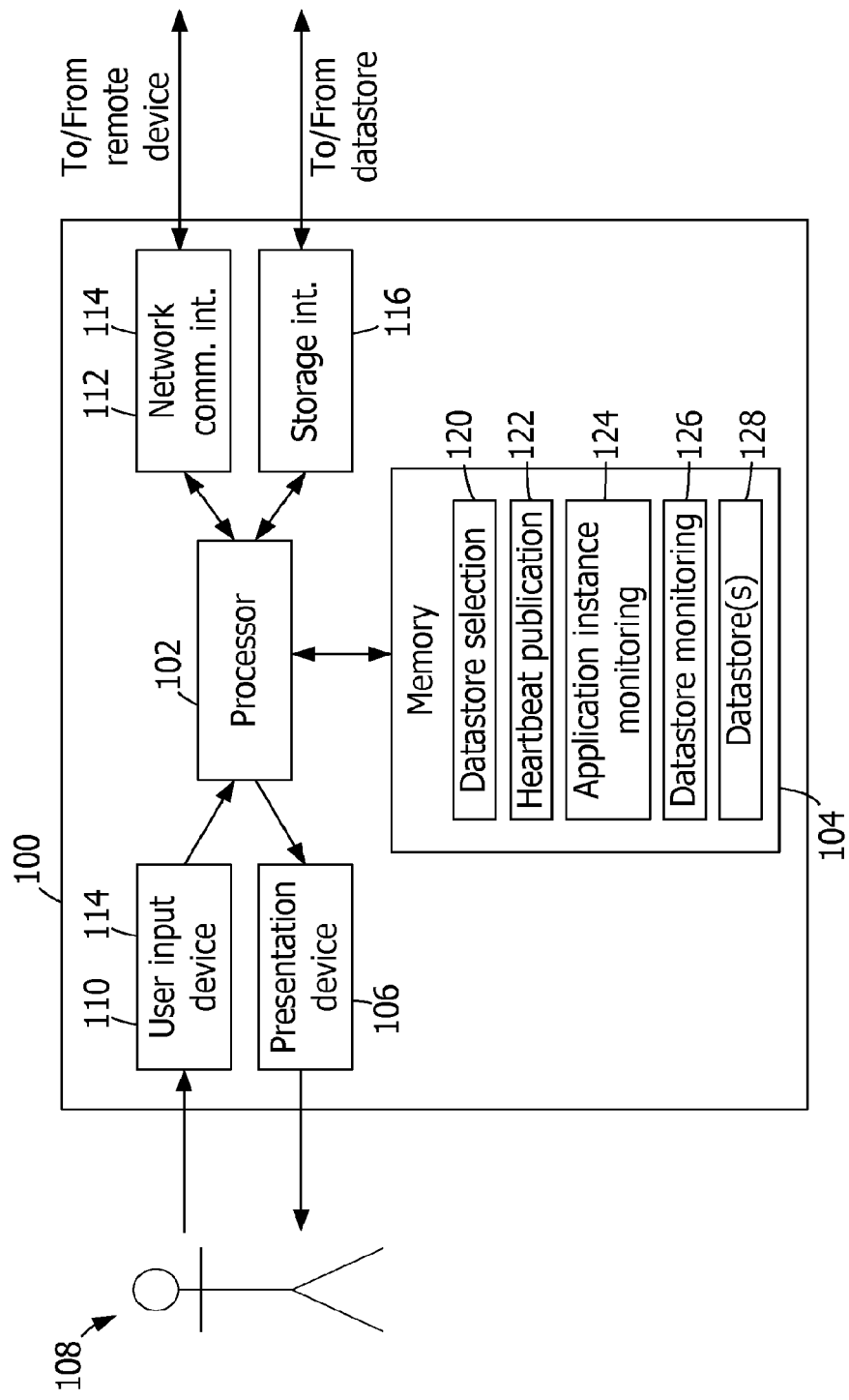
FIG. 1 is a block diagram of an exemplary computing device.

FIG. 1 is a block diagram of an exemplary computing device 100. Computing device 100 includes a processor 102 for executing instructions. In some embodiments, executable instructions are stored in a memory 104. Memory 104 is any device allowing information, such as executable instructions, suitability values, configuration options (e.g., predetermined durations for receiving transmissions), and/or other data, to be stored and retrieved. For example, memory 104 may include one or more random access memory (RAM) modules, flash memory modules, hard disks, solid state disks, and/or optical disks.

Computing device 100 also includes at least one presentation device 106 for presenting information to a user 108. Presentation device 106 is any component capable of conveying information to user 108. Presentation device 106 may include, without limitation, a display device (e.g., a liquid crystal display (LCD), organic light emitting diode (OLED) display, or "electronic ink" display) and/or an audio output device (e.g., a speaker or headphones). In some embodiments, presentation device 106 includes an output adapter, such as a video adapter and/or an audio adapter. An output adapter is operatively coupled to processor 102 and configured to be operatively coupled to an output device, such as a display device or an audio output device.

The computing device 100 may include a user input device 110 for receiving input from user 108. User input device 110 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of presentation device 106 and user input device 110.

Computing device 100 also includes a network communication interface 112, which enables computing device 100 to communicate with a remote device (e.g., another computing device 100) via a communication medium, such as a wired or wireless packet network. For example, computing device 100 may transmit and/or receive messages (e.g., heartbeat messages and/or execution commands) via network communication interface 112. User input device 110 and/or network communication interface 112 may be referred to as an input interface 114.

Computing device 100 further includes a storage interface 116 that enables computing device 100 to communicate with one or more datastores. In exemplary embodiments, storage interface 116 couples computing device 100 to a storage area network (SAN) (e.g., a Fibre Channel network) and/or to a network-attached storage (NAS) system (e.g., via a packet network). The storage interface 116 may be integrated with network communication interface 112.

In exemplary embodiments, memory 104 stores computer-executable instructions for performing one or more of the operations described herein. Memory 104 may include one or more computer-readable storage media that have computer-executable components embodied thereon. In the example of FIG. 1, memory 104 includes a datastore selection component 120, a heartbeat publication component 122, and, optionally, an application instance monitoring component 124, a datastore monitoring component 126, and/or one or more datastores 128.

When executed by processor 102, datastore selection component 120 causes processor 102 to identify a plurality of datastores to which a subordinate host has read-write access, to select from the plurality of datastores a first heartbeat datastore and a second heartbeat datastore based on a quantity of hosts that have access to the first and second heartbeat datastores, and to associate the first and second heartbeat datastores with the host. When executed by processor 102, heartbeat publication component 122 causes processor 102 to transmit to a master host a heartbeat message indicating that the subordinate host is operative at a current time and to store in the first and second heartbeat datastores heartbeat data indicating that the subordinate host is operative at the current time. When executed by processor 102, application instance monitoring component 124 causes processor 102 to determine whether a heartbeat message is received from the subordinate host at the master host, to determine whether the subordinate host has stored the heartbeat data in the first heartbeat datastore and the second heartbeat datastore when no heartbeat message is received from the subordinate host at the master host, and to restart a software application instance associated with the subordinate host when the subordinate host has not stored the heartbeat data in the first heartbeat datastore or in the second heartbeat datastore. When executed by processor 102, datastore monitoring component 126 causes processor 102 to detect a newly available datastore or an impending unavailability of a datastore and to execute the datastore selection component based on such detection.

In some embodiments, a portion of the illustrated components is included in memory 104 based on the function of computing device 100. For example, as described in more detail below, a management server may include datastore selection component 120, and a host may include heartbeat publication component 122.

Figure 2:
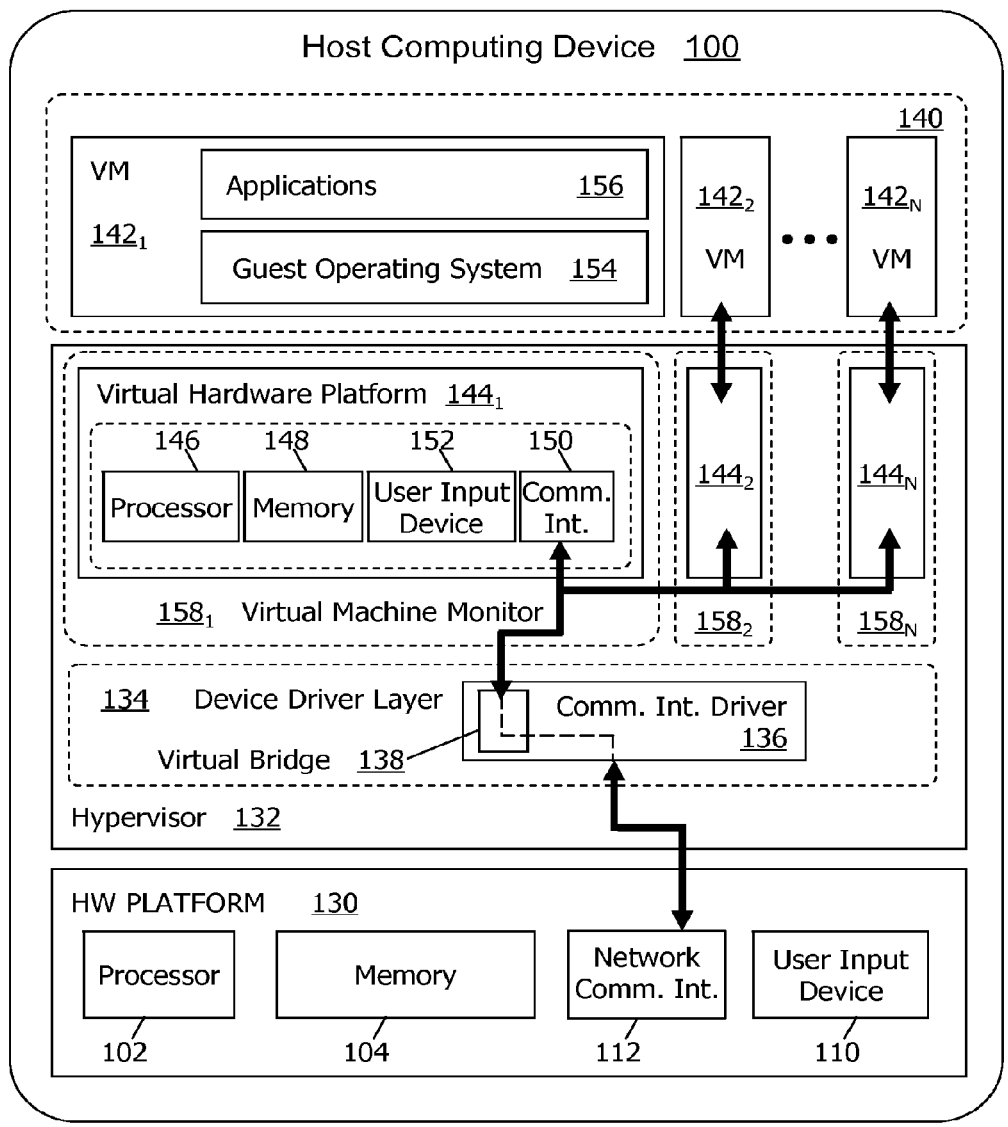
FIG. 2 is a block diagram of virtual machines that are instantiated on a computing device, such as the computing device shown in FIG. 1.

FIG. 2 depicts a block diagram of virtual machines $142_1$, $142_2$ ... $142_N$ that are instantiated on a computing device 100, which may be referred to as a "host". Computing device 100 includes a hardware platform 130, such as an x86 architecture platform. Hardware platform 130 may include processor 102, memory 104, network communication interface 112, user input device 110, and other input/output (I/O) devices, such as a presentation device 106 (shown in FIG. 1). A virtualization software layer, also referred to hereinafter as a hypervisor 132, is installed on top of hardware platform 130.

The virtualization software layer supports a virtual machine execution space 140 within which multiple virtual machines (VMs $142_1$-$142_N$) may be concurrently instantiated and executed. Hypervisor 132 includes a device driver layer 134, and maps physical resources of hardware platform 130 (e.g., processor 102, memory 104, network communication interface 112, and/or user input device 110) to "virtual" resources of each of VMs $142_1$-$142_N$ such that each of VMs $142_1$-$142_N$ has its own virtual hardware platform (e.g., a corresponding one of virtual hardware platforms $144_1$-$144_N$), each virtual hardware platform having its own emulated hardware (such as a processor 146, a memory 148, a network communication interface 150, a user input device 152 and other emulated I/O devices in VM $142_1$).

In some embodiments, memory 148 in first virtual hardware platform $144_1$ includes a virtual disk that is associated with or "mapped to" one or more virtual disk images stored in memory 104 (e.g., a hard disk or solid state disk) of computing device 100. The virtual disk image represents a file system (e.g., a hierarchy of directories and files) used by first virtual machine $142_1$ in a single file or in a plurality of files, each of which includes a portion of the file system. In addition, or alternatively, virtual disk images may be stored in memory 104 of one or more remote computing devices 100, such as in a storage area network (SAN) configuration. In such embodiments, any quantity of virtual disk images may be stored by the remote computing devices 100.

Device driver layer 134 includes, for example, a communication interface driver 136 that interacts with network communication interface 112 to receive and transmit data from, for example, a local area network (LAN) connected to computing device 100. Communication interface driver 136 also includes a virtual bridge 138 that simulates the broadcasting of data packets in a physical network received from one communication interface (e.g., network communication interface 112) to other communication interfaces (e.g., the virtual communication interfaces of VMs $142_1$-$142_N$). Each virtual communication interface for each VM $142_1$-$142_N$, such as network communication interface 150 for first VM $142_1$, may be assigned a unique virtual Media Access Control (MAC) address that enables virtual bridge 138 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 138, which, in turn, is able to further forward the Ethernet packets to VMs $142_1$-$142_N$. This configuration enables an Ethernet packet that has a virtual MAC address as its destination address to properly reach the VM in computing device 100 with a virtual communication interface that corresponds to such virtual MAC address.

Virtual hardware platform $144_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 154 in order to execute applications 156 for an instantiated VM, such as first VM $142_1$. Virtual hardware platforms $144_1$-$144_N$ may be considered to be part of virtual machine monitors (VMM) $158_1$-$158_N$ which implement virtual system support to coordinate operations between hypervisor 132 and corresponding VMs $142_1$-$142_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $144_1$-$144_N$ may also be considered to be separate from VMMs $158_1$-$158_N$, and VMMs $158_1$-$158_N$ may be considered to be separate from hypervisor 132. One example of hypervisor 132 that may be used in an embodiment of the disclosure is included as a component in VMware's ESX brand software, which is commercially available from VMware, Inc.

Figure 3:
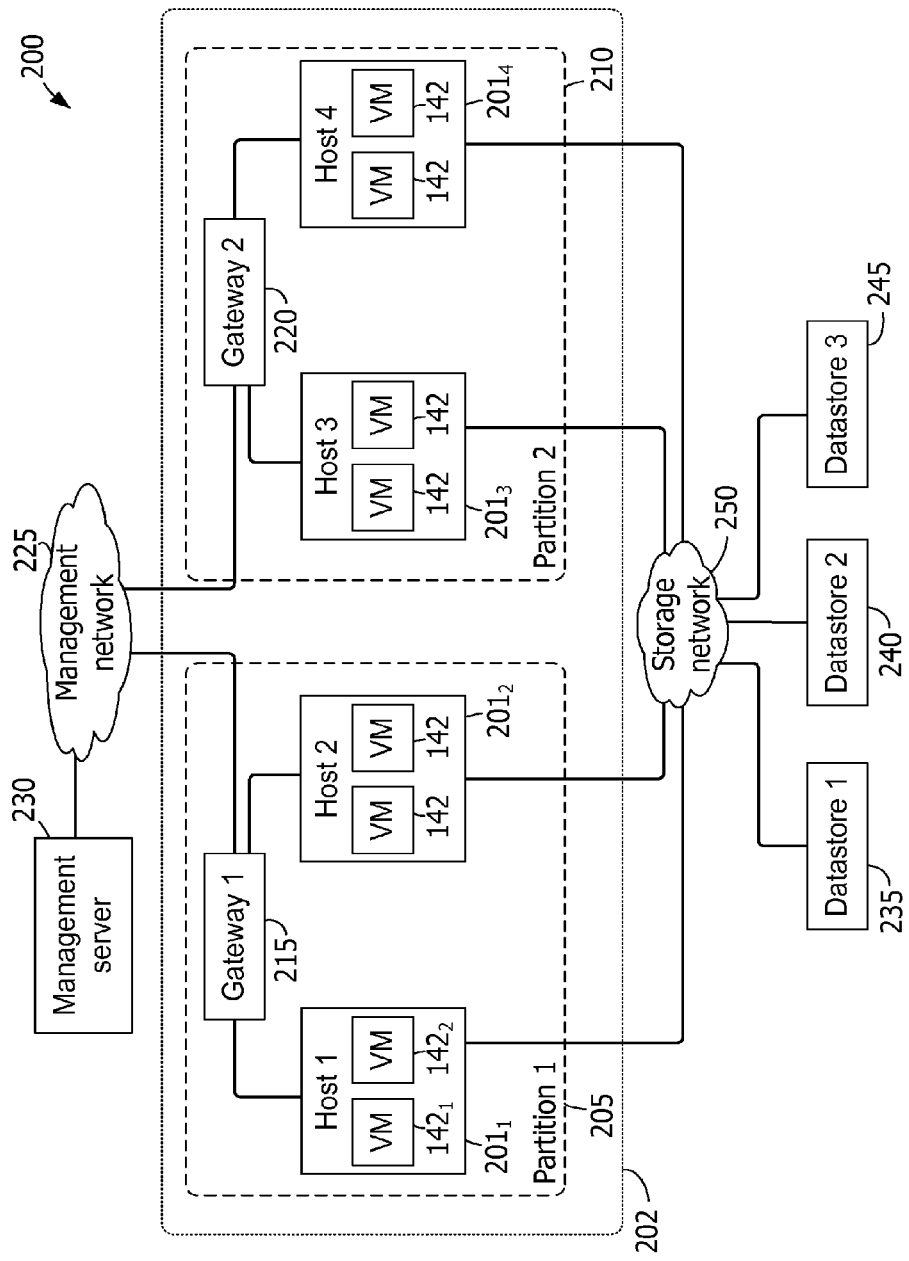
FIG. 3 is a block diagram of an exemplary cluster of computing devices and virtual machines.

FIG. 3 is a block diagram of an exemplary cluster 200 of hosts 201 and virtual machines (VMs) 142. Cluster 200 includes a fault domain 202 with a first group 205 and a second group 210 of hosts 201. First group 205 includes a first host $201_1$ and a second host $201_2$. Second group 210 includes a third host $201_3$ and a fourth host $201_4$. Each host 201 executes one or more software application instances. For example, first host $201_1$ executes first VM $142_1$ and second VM $142_2$. It is contemplated that fault domain 202 may include any quantity of host groups, and each host group may include any quantity of hosts 201 executing any quantity of software application instances.

Hosts $201_1$ and $201_2$ in first group 205 communicate with each other via a first gateway 215. Hosts $201_3$ and $201_4$ in second group 210 communicate with each other via a second gateway 220. Further, first gateway 215 and second gateway 220 communicate with each other via a management network 225, such that hosts $201_1$ and $201_2$ in first group 205 are capable of communicating with hosts $201_3$ and $201_4$ in second group 210. A management server 230 is also connected to management network 225 and communicates with hosts 201 via management network 225, first gateway 215, and second gateway 220. In exemplary embodiments, management server 230 creates and distributes to hosts 201 a host list that includes a host identifier (ID) for each host 201 in fault domain 202 and, associated with each host 201, one or more network addresses and one or more heartbeat datastores. Although management server 230 is shown outside fault domain 202, the functions of management server 230 may be incorporated into fault domain 202. For example, management server 230 may be included in first group 205 or second group 210. Alternatively, the functions described with reference to management server 230 may be performed by one or more VMs 142 executed by one or more hosts 201 in fault domain 202. Hosts 201, first gateway 215, second gateway 220, and management server 230 may be computing devices 100 (shown in FIG. 1).

Cluster 200 includes a first datastore 235, a second datastore 240, and a third datastore 245. In exemplary embodiments, datastores 235, 240, 245 are stored in memory 104 (shown in FIG. 1) of one or more computing devices 100. For example, datastores 235, 240, 245 may be stored in an array of hard disk drives and/or solid state drives. Hosts 201 communicate with datastores 235, 240, 245 via a storage network 250. For example, storage network 250 may include a storage area network (SAN) using a protocol such as Fibre Channel and/or Internet Small Computer System Interface (iSCSI). As another example, storage network 250 may include a network-attached storage (NAS) system using a protocol such as Server Message Block (SMB) and/or Network File System (NFS).

Hosts 201 execute one or more software application instances, such as VMs 142, which are associated with virtual disk images, configuration files, and/or other data stored in file systems provided by datastores 235, 240, 245. In some embodiments, each datastore 235, 240, 245 includes a "protected list" that identifies software application instances stored in the datastore that are to be maintained in an operating state. For example, if the datastore stores a VM 142, the protected list may include the file system path of a configuration file associated with the VM 142 or the file system path of a virtual disk image associated with the VM 142.

A mutually exclusive ("mutex") lock associated with the protected list may be used to indicate control of any software application instances referenced in the list. For example, a host 201 may obtain a mutex lock to the protected list stored in first datastore 235 and thereby obtain control over all VMs 142 associated with virtual disk images identified in the protected list.

To coordinate the activity of hosts 201 and/or VMs 142, one host 201 may operate as a master host. The hosts 201 other than the master host may be referred to as subordinate hosts. In exemplary embodiments, each host 201 executes a fault domain manager (FDM) software application that includes executable instructions for selecting one of the hosts 201 as a master host. The FDM application also includes instructions for acting as a master host and for acting as a subordinate host. The operation of a host 201 executing the FDM application as a master host is described below with reference to FIG. 6. The operation of a host 201 executing the FDM application as a subordinate host is described below with reference to FIG. 5.

The methods described herein may be executed by each host 201 within cluster 200, such that each host 201 is capable of selecting a master host, acting as the master host, and acting as a subordinate host, as appropriate. In some scenarios, a malfunction (e.g., a failure of management network 225, first gateway 215, or second gateway 220), may divide hosts 201 into isolated or "partitioned" groups, such as first group 205 and second group 210. In such a scenario, first group 205 and second group 210 may be referred to as a first partition 205 and a second partition 210, respectively. Exemplary embodiments enable a master host to manage (e.g., monitor and/or restart) software application instances hosted by subordinate hosts even when such a partitioning occurs.

In exemplary embodiments, each host 201 in cluster 202 acting as a master host repeatedly (e.g., periodically, continuously, and/or upon request) provides cluster status information to management server 230. The cluster status information includes, for example, the state of one or more hosts 201 being monitored by the master host, the software application instances being executed by such monitored hosts, the actual protection state of such software application instances, and/or events, such as the initiation of an execution or a termination of a software application instance by a monitored host 201. Management server 230 receives and combines the cluster status information from any master hosts in cluster 202 and provides the combined cluster status information for presentation to a user. For example, referring also to FIG. 1, management server 230 may present the combined cluster status information using a presentation interface 106 and/or transmit, using network communication interface 112, the combined cluster status information to another computing device 100 for presentation.

Figure 4:
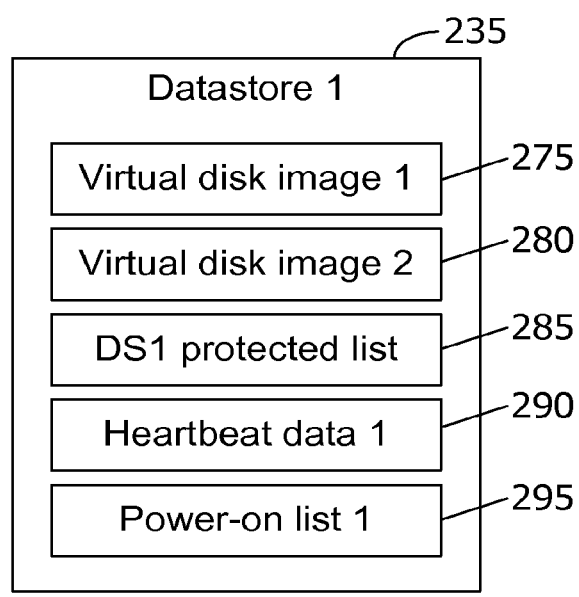
FIG. 4 is a block diagram of exemplary data stored in a datastore, such as the first datastore shown in FIG. 3.

FIG. 4 is a block diagram of exemplary data stored in first datastore 235. Referring to FIGS. 3 and 4, first datastore 235 includes a first virtual disk image 275 associated with first VM $142_1$ and a second virtual disk image 280 associated with second VM $142_2$. In exemplary embodiments, first host $201_1$ accesses first virtual disk image 275 and second virtual disk image 280 while executing first VM $142_1$ and second VM $142_2$, respectively.

First datastore 235 also includes a first datastore protected list 285 that identifies software application instances (e.g., first VM $142_1$ and second VM $142_2$) stored in first datastore 235 that are to be maintained in an operating state. For example, first datastore may be created and/or updated by a host 201 executing the FDM application as a master host.

First datastore 235 further includes heartbeat data 290 and a power-on list 295 associated with first host $201_1$. In exemplary embodiments, heartbeat data 290 is stored in first datastore 235 by first host $201_1$ and indicates that first host $201_1$ is operative at the time heartbeat data 290 is stored. For example, heartbeat data 290 may include the time at which first host $201_1$ stores heartbeat data 290 and/or the time at which first host $201_1$ determined it was operative. Power-on list 295 is also stored by first host $201_1$ and indicates software application instances being executed by first host $201_1$ (e.g., at the time included in heartbeat data 290). Accordingly, power-on list 295 may be understood to indicate software application instances for a master host to restart at a host other than first host $201_1$ if first host $201_1$ becomes inoperative.

In some embodiments, first host $201_1$ stores heartbeat data 290 and power-on list 295 in a plurality of datastores. Such embodiments facilitate monitoring hosts 201 even when a datastore malfunctions or becomes unreachable.

Figure 5:
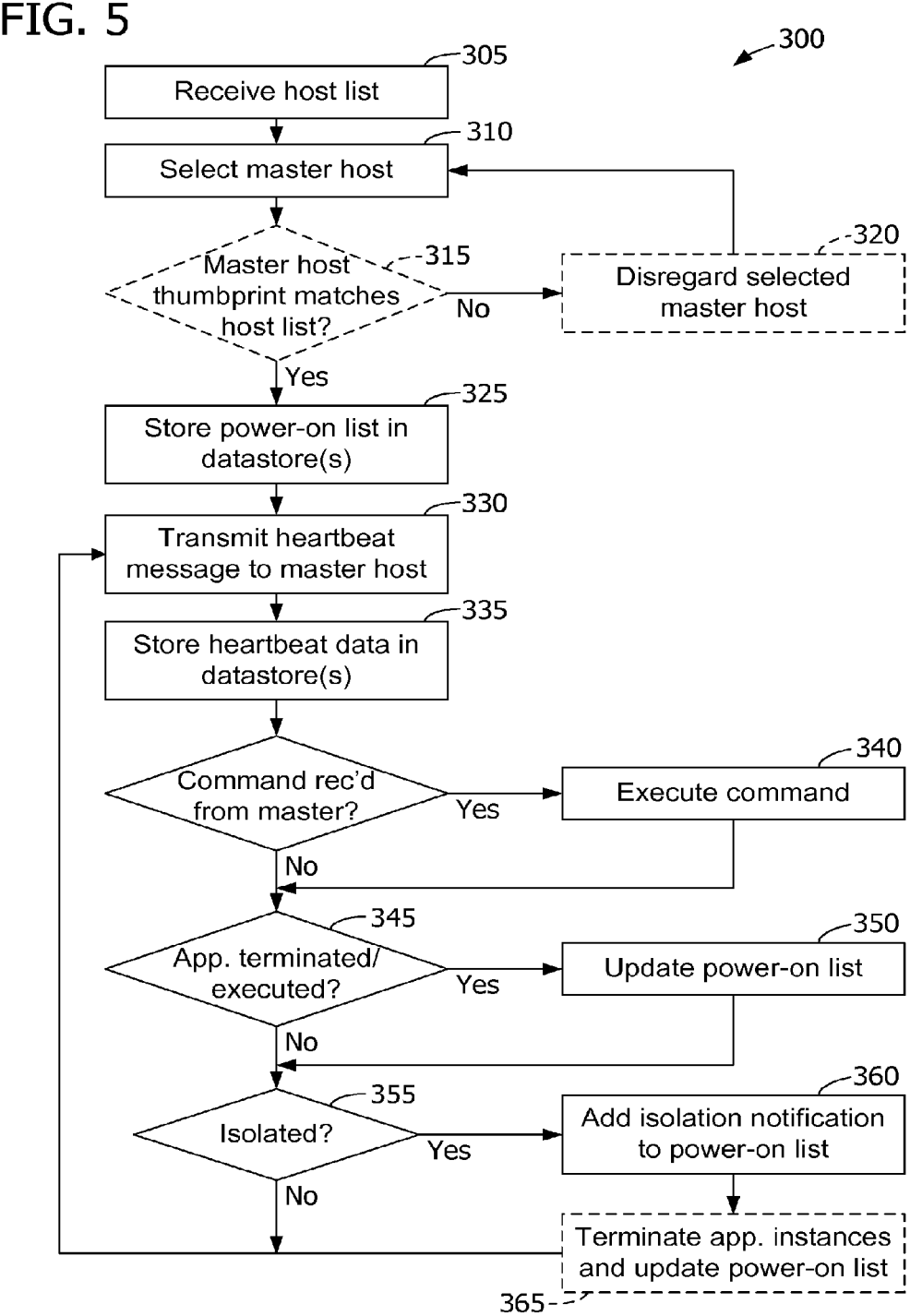
FIG. 5 is a flowchart of an exemplary method performed by a host, such as the hosts shown in FIG. 3, executing a fault domain manager (FDM) software application as a subordinate host.

FIG. 5 is a flowchart of an exemplary method 300 performed by a host 201 (shown in FIG. 3) executing the FDM software application as a subordinate host. Referring to FIGS. 3 and 5, for purposes of the following description, third host $201_3$ is referred to as a subordinate host. Subordinate host $201_3$ receives 305 a host list from management server 230. The host list includes information about one or more hosts 201. For example, the host list may include a host identifier (ID) for each host 201 in cluster 202 and, associated with each host ID, one or more heartbeat datastores that are associated with the corresponding host 201. Subordinate host $201_3$ identifies within the host list the heartbeat datastores associated with the host ID of subordinate host $201_3$. For example, the host list may indicate that first datastore 235 and second datastore 240 are the heartbeat datastores associated with subordinate host $201_3$.

Subordinate host $201_3$ selects 310 from the hosts 201 within fault domain 202 a master host. For example, subordinate host $201_3$ may select 310 a host 201 that is best suited to act as a master host based on performance metrics. In some embodiments, the host list received 305 from management server 230 includes a thumbprint associated with each host 201 in fault domain 202. Subordinate host $201_3$ compares 315 the thumbprint received from the master host with the thumbprint associated with the master host in the host list. When the thumbprints do not match, subordinate host $201_3$ disregards 320 messages from the selected master host (e.g., for a predetermined duration) and selects 310 a different master host.

After selecting 310 a master host, subordinate host $201_3$ may transmit to the master host information such as the software application instances subordinate host $201_3$ is executing, one or more properties of such software application instances (e.g., identifiers of hosts 201 that are compatible with a software application instance and/or host attributes associated with the software application instance), datastores that are accessible to subordinate host $201_3$, and/or one or more host properties (e.g., available memory or maximum quantity of software application instances subordinate host $201_3$ may execute). Further, if such information changes, subordinate host $201_3$ may transmit updated host information to the master host.

Subordinate host $201_3$ stores 325 a power-on list in each heartbeat datastore associated with subordinate host $201_3$ in the host list (e.g., first datastore 235 and second datastore 240). The power-on list indicates software application instances for a master host to restart at a host 201 other than subordinate host $201_3$ if subordinate host $201_3$ becomes inoperative. In exemplary embodiments, the software application instances in the power-on list are virtual machines (VMs) that have been designated as protected at management server 230.

Subordinate host $201_3$ transmits 330, via second gateway 220 and/or management network 225, a heartbeat message to the master host. The heartbeat message indicates that subordinate host $201_3$ is operative at the current time. Subordinate host also $201_3$ stores 335 heartbeat data in each heartbeat datastore associated with subordinate host $201_3$. Like the transmitted heartbeat message, the stored heartbeat data indicates that subordinate host $201_3$ is operative at the current time. Providing such an indication by both a network and a datastore enables the master host to distinguish between a scenario in which subordinate host $201_3$ is completely inoperative and a scenario in which subordinate host $201_3$ is merely unreachable by second gateway 220 and/or management network 225.

In exemplary embodiments, subordinate host $201_3$ is configured to execute 340 commands received from the master host. For example, subordinate host $201_3$ may receive and execute 340 a command instructing subordinate host $201_3$ to execute, terminate, or restart a software application instance. A command may be received by receiving a transmitted command message (e.g., via first gateway 215 and/or second gateway 220) and/or by monitoring a datastore (e.g., a heartbeat datastore associated with subordinate host $201_3$) for command data.

Subordinate host $201_3$ detects 345 whether any protected software application instances have terminated or been executed since the power-on list was stored 325. Subordinate host $201_3$ updates 350 the power-on list in the heartbeat datastores to add any protected software application instances that have been executed and to remove any protected software application instances that have terminated.

Subordinate host $201_3$ may automatically detect 355 and respond to a condition in which subordinate host $201_3$ is isolated from fault domain 202. In exemplary embodiments, subordinate host $201_3$ detects 355 whether subordinate host $201_3$ is isolated by determining whether subordinate host $201_3$ is able to communicate with one or more other devices in cluster 202 (e.g., second gateway 220, management server 230, and/or any other host 201). For example, subordinate host 201₃ may attempt to open a connection to and/or transmit a ping message to one or more of these devices. If subordinate host 201₃ is unable to communicate with (e.g., cannot open a connection to or does not receive a response ping message from) any of the devices, subordinate host 201₃ adds 360 an isolation notification to the power-on list in the heartbeat datastores. The isolation notification indicates to another device (e.g., a master host) that subordinate host 201₃ is unable to communicate.

In some embodiments, subordinate host 201₃ also terminates 365 software application instances being executed by subordinate host 201₃ and updates the power-on list to remove the terminated software application instances. Such embodiments encourage the master host to restart the software application instances at another host 201 that is not isolated. Termination 365 may be performed only for software application instances that have been designated for automatic termination by a user. Further, subordinate host 201₃ may terminate 365 a software application instance only when subordinate host 201₃ determines that a master host is monitoring the software application instance. For example, subordinate host 201₃ may determine whether a master host has acquired an exclusive lock to a protected list including the software application instance. In addition, or alternatively, subordinate host 201₃ may determine whether the heartbeat datastores associated with subordinate host 201₃ are accessible to a master host and refrain from terminating 365 software application instances if not. In some embodiments, subordinate host 201₃ receives a cluster configuration defining an isolation response strategy from another host (e.g., a master host). In response to detecting 355 an isolation condition, subordinate host 201₃ performs one or more of the operations described above based on the isolation response strategy.

Each host 201 acting as a subordinate host in fault domain 202 may execute at least a portion of method 300 repeatedly (e.g., periodically, continuously, and/or upon request). For example, each subordinate host may repeatedly store 325 a power-on list, transmit 330 heartbeat messages, and store 335 heartbeat data. Further, in some embodiments, hosts 201 not acting as subordinate hosts may repeatedly store 325 a power-on list, transmit 330 heartbeat messages and store 335 heartbeat data. Such embodiments facilitate indicating the operative state of a host 201 to any master host that may be monitoring a software application instance executed by the host 201, regardless of whether the host 210 is acting as a master host, a subordinate host, or neither. For example, a first master host may determine that a second host is operative based on the heartbeat data stored 335 by the second host, even if the second host is in a different partition or becomes isolated.

Figure 6:
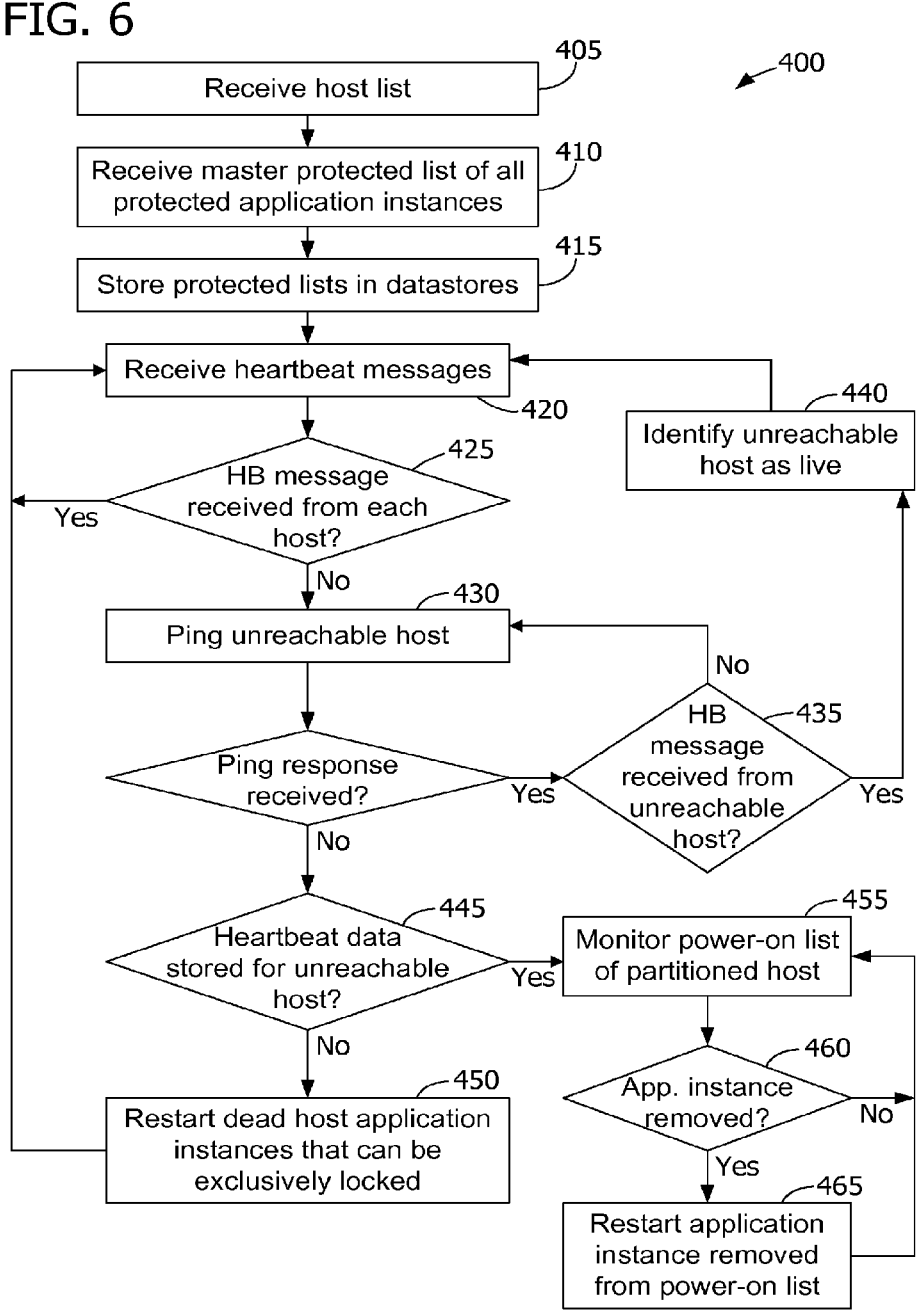
FIG. 6 is a flowchart of an exemplary method performed by a host, such as the hosts shown in FIG. 3, executing the FDM software application as a master host.
Figure 7:
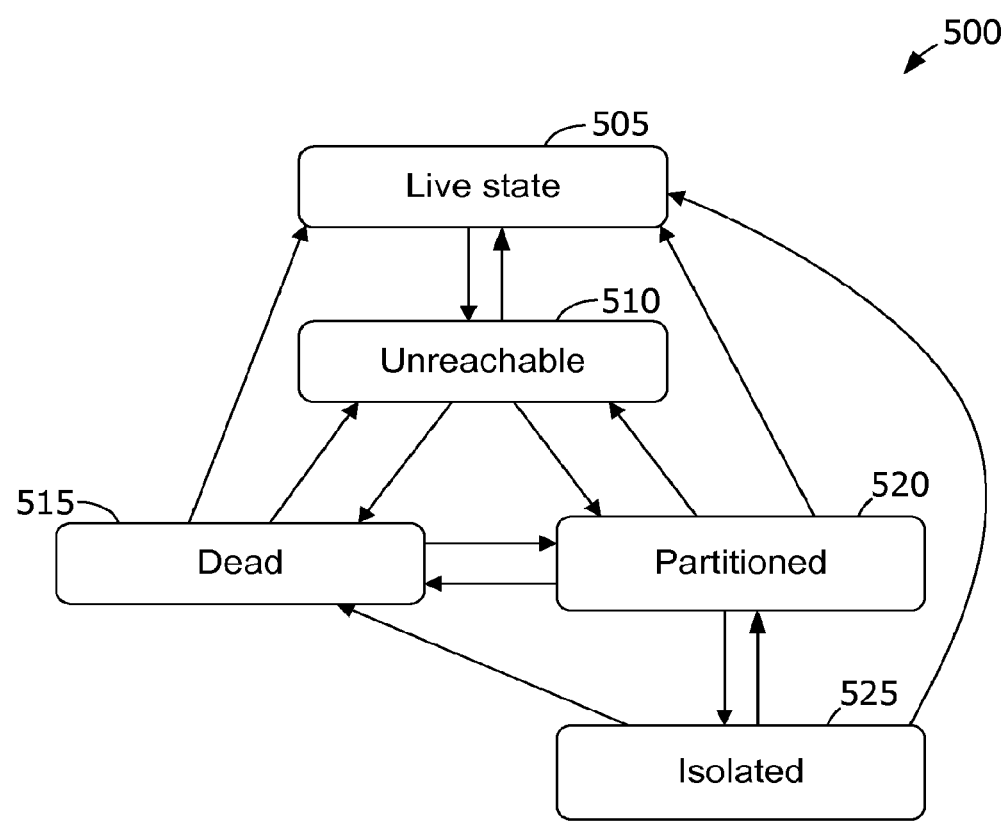
FIG. 7 is an exemplary state diagram representing states and state transitions used by a master host in performing the method shown in FIG. 6.

FIG. 6 is a flowchart of an exemplary method 400 performed by a host 201 (shown in FIG. 3) executing the FDM software application as a master host. FIG. 7 is an exemplary state diagram 500 representing states and state transitions used by a master host in performing method 400. Referring to FIGS. 3 and 6, in some embodiments, fault domain 202 typically has one master host. In some scenarios, such as an isolation of first group 205 from second group 210, a plurality of master hosts may be determined, and each master host may perform method 400. When first group 205 and second group 210 are reconnected, one of the master hosts is selected as the master host for fault domain 202. The unselected master host releases any resources (e.g., file locks) it used as a master host and begins operating as a subordinate host, as described with reference to FIG. 5.

For purposes of the following description, first host 201₁ is referred to as the master host of fault domain 202. In exemplary embodiments, master host 201₁ receives 405 a host list from management server 230. The host list includes a host identifier (ID) for each host 201 in fault domain 202 and, associated with each host 201, one or more network addresses and one or more heartbeat datastores. Master host 201₁ also receives 410 from management server 230 a master protected list of all protected software application instances in fault domain 202. Master host 201₁ may store or "cache" the host list and/or the master protected list in memory 104 (shown in FIG. 1).

Master host 201₁ stores 415 a datastore-specific protected list in each datastore 235, 240, 245. Each datastore-specific protected list identifies one or more software application instances (e.g., virtual machines) within fault domain 202 and stored in the corresponding datastore that are to be maintained in an operating state. In exemplary embodiments, the master protected list includes a datastore reference (e.g., identifier) associated with each software application instance, and master host 201₁ creates the protected list for a datastore at least in part by selecting all software application instances in the master protected list that are associated with a reference to the datastore. Master host 201₁ may maintain the protected lists. For example, as a software application instance stored in a datastore is started, master host 201₁ may add the software application instance to the corresponding protected list. As a software application instance is voluntarily terminated by a user, master host 201₁ may remove the software application instance from the corresponding protected list.

In some embodiments, master host 201₁ also receives updates to the master protected list from management server 230 as software application instances are started and terminated. Each master protected list includes a version number, which is incremented as the master protected list is revised. Master host 201₁ stores 415 any updates, including the version number, to each datastore-specific protected list to which master host 201₁ has exclusive access, indicating the version of the master protected list to which each datastore-specific protected list corresponds. Alternatively, a version number may be associated with each software application instance in the master protected list. In some embodiments, master host 201₁ stores 415 updates only to datastore-specific protected lists that include software application instances associated with an incremented version number.

When obtaining exclusive access to a datastore (e.g., by locking a datastore-specific protected list), master host 201₁ may compare the version number in the datastore-specific protected list that is stored in the datastore (e.g., by master host 201₁ or by another host 201 acting as a master host in another partition), to the version number in the master protected list that master host 201₁ received 410 from management server 230. If the version number of the protected list stored in the datastore is greater, master host 201₁ uses the stored protected list. Such embodiments enable master host 201₁ to receive an update to a protected list even if master host 201₁ is unable to communicate with management server 230 directly.

Master host 201₁ may be unable to directly access all datastores in cluster 200. Accordingly, master host 201₁ may use one or more other hosts 201 in fault domain 202 as a proxy to access such datastores. Further, if master host 201₁ requires an exclusive lock on a file, the host 201 acting as a proxy may acquire and maintain such a lock.

Referring also to FIG. 7, master host $201_1$ initially assigns a live state 505 to each host 201. Master host $201_1$ receives 420 heartbeat messages from the hosts 201 in fault domain 202. In some embodiments, master host $201_1$ transmits a heartbeat request message to all other hosts 201, which respond by transmitting to master host $201_1$ a heartbeat response message. In other embodiments, the hosts 201 periodically initiate the transmission of a heartbeat message. If a heartbeat message is received from each of the hosts 201, master host $201_1$ maintains each host 201 in live state 505 and continues receiving 420 heartbeat messages.

When master host $201_1$ determines 425 that no heartbeat message has been received 420 from a host 201 in a predetermined duration (e.g., five seconds, ten seconds, or thirty seconds), master host $201_1$ assigns an unreachable state 510 to that host 201. For purposes of this description, it is assumed that third host $201_3$ is identified as unreachable.

Master host $201_1$ transmits 430 an echo or "ping" request message to third host $201_3$. If no ping response message is received from third host $201_3$, master host $201_1$ continues by repeatedly determining 435 whether a heartbeat message is received by third host $201_3$ and transmitting 430 ping request messages to third host $201_3$. If a heartbeat message is received from third host $201_3$, master host $201_1$ identifies 440 third host $201_3$ as live, assigning live state 505 to third host $201_3$.

If, at any point while third host $201_3$ is assigned unreachable state 510, master host $201_1$ does not receive a ping response message from third host $201_3$, master host $201_1$ determines 445 whether third host $201_3$ has stored heartbeat data in any of the heartbeat datastores associated with third host $201_3$ in the host list received 405 from management server 230. For example, master host $201_1$ may determine 445 whether the heartbeat data has been stored by third host $201_3$ within a predetermined duration (e.g., five seconds, ten seconds, or thirty seconds).

If third host $201_3$ has not stored heartbeat data, master host $201_1$ assigns a dead status 515 to third host $201_3$ and, based on third host $201_3$ being identified as dead, restarts 450 protected software application instances (e.g., as indicated by the master protected list) at hosts 201 other than third host $201_3$. Master host $201_1$ may restart 450 a software application instance by instructing a host 201 to execute the software application instance. For example, master host $201_1$ may transmit an execution command message to the host 201 and/or may store execution command data in a datastore that is accessible by the host 201, such as a heartbeat datastore associated with the host 201.

Master host $201_1$ may monitor the restart 450 of software application instances and reattempt the restart 450 of any software application instance that fails to execute. In some embodiments, master host $201_1$ identifies a datastore that stores data (e.g., a virtual disk image) associated with a protected software application instance and restarts 450 the protected software application instance based on determining that a file stored in the identified datastore, such as the protected list for the datastore, can be exclusively locked. Further, in such embodiments, if master host $201_1$ is unable to acquire an exclusive lock on the protected list, master host $201_1$ may periodically reattempt to acquire such a lock and restart 450 the protected software application instances if the lock is successfully acquired. Such an embodiment facilitates maintaining high availability of protected software application instances when another host 201 acting as a master host becomes inoperative.

Further, in such embodiments, after acquiring an exclusive lock on the protected list, master host $201_1$ may periodically determine whether master host $201_1$ still possesses the exclusive lock. If so, or if master host $201_1$ is able to reacquire the exclusive lock, master host $201_1$ continues operating as described above. If master host $201_1$ does not possess and cannot reacquire the exclusive lock on the protected list because, for example, another host 201 possesses such an exclusive lock, master host $201_1$ may cease monitoring software application instances included in the protected list.

If third host $201_3$ has stored heartbeat data in one or more of the heartbeat datastores associated with third host $201_3$, master host $201_1$ assigns a partitioned state 520 to third host $201_3$, indicating that third host $201_3$ is operative but unable to communicate with master host $201_1$ via management network 225. In some embodiments, third host $201_3$ includes an isolation notification in the power-on list stored in the heartbeat datastore when third host $201_3$ is incapable of communicating with other devices in cluster 202. Master host $201_1$ determines whether the power-on list includes an isolation notification. If so, master host $201_1$ assigns an isolate state 525 to third host $201_3$.

Based on identifying third host $201_3$ as partitioned or isolated, master host $201_1$ monitors 455 the power-on list stored in the heartbeat datastore by third host $201_3$. As described above with reference to FIG. 5, the power-on list indicates protected software application instances, such as virtual machines, being executed by third host $201_3$. Master host $201_1$ determines 460 whether any software application instances are removed from the power-on list. If no instances are removed, master host $201_1$ continues monitoring 455 the power-on list. When master host $201_1$ determines 460 that a software application instance is removed from the power-on list, master host $201_1$ restarts 465 the software application instance at a host 201 other than third host $201_3$. Master host $201_1$ may monitor the restart 465 of the software application instance and reattempt the restart 465 if the software application instance fails to execute.

When restarting 450, 465 a software application instance, master host $201_1$ may select a host 201 based on information from management server 230. For example, management server 230 may transmit to master host $201_1$ application instance compatibility information, such as identifiers of hosts 201 that are compatible with a software application instance and/or host attributes associated with the software application instance. Master host $201_1$ may select a host 201 to instruct to execute the software application instance based on such application instance compatibility information.

While method 400 is described above with reference to particular states and state transitions, method 400 may be practiced with different states or without any states. Further, method 400 may perform additional state transitions. For example, whenever master host $201_1$ determines that a heartbeat message is received from third host $201_3$, master host $201_1$ may identify 440 third host $201_3$ as live. Similarly, if master host $201_1$ determines that a ping response message is received from third host $201_3$ while in partitioned state 520 or dead state 515, master host $201_1$ may assign unreachable state 510 to third host $201_3$. If master host $201_1$ determines that third host $201_3$ has stored heartbeat data in a heartbeat datastore while in dead state 515, or that third host $201_3$ has removed an isolation notification from a power-on list corresponding to third host $201_3$ while in isolated state 525, master host $201_1$ may assign partitioned state 520 to third host $201_3$. Further, if third host $201_3$ has not stored heartbeat data while in partitioned state 520 or isolated state 525, master host $201_1$ may assign a dead status 515 to third host 201₃ and restart 450 protected software application instances associated with third host 201₃, as described above.

In exemplary embodiments, the host 201 acting as the master host in fault domain 202 executes at least a portion of method 400 repeatedly (e.g., periodically, continuously, and/or upon request). For example, the master host may repeatedly receive 420 heartbeat messages and determine 425 whether heartbeat messages are received from each host 201.

FIG. 8 is a flowchart of an exemplary method 600 performed by management server 230. In exemplary embodiments, management server 230 determines 605 the accessibility of each datastore in cluster 200. The accessibility of a datastore may be determined 605, for example, by identifying the quantity of hosts 201 that have read-write access to the datastore.

Management server 230 is configured to select a predetermined target quantity of heartbeat datastores (e.g., two, three, or five) for each host 201 in fault domain 202. For each host 201 in fault domain 202, management server 230 identifies 610 a plurality of datastores to which host 201 has read-write access. If the quantity of accessible datastores is less than or equal to the target quantity, management server 230 selects 615 all of the accessible datastores. Otherwise, management server 230 selects accessible datastores as heartbeat datastores based on various performance-related factors, as described below.

For example, the performance-related factors may include the accessibility of each datastore, and management server 230 may select as heartbeat datastores those datastores that have the greatest accessibility. Accessibility-based heartbeat datastore selection encourages the association of each host 201 with the same set of heartbeat datastores, such that the host 201 acting as the master host monitors a relatively small quantity of datastores. For example, if all hosts 201 are associated with the same heartbeat datastores, the quantity of datastores monitored 455 (shown in FIG. 6) by the master host may be equal to the target quantity of heartbeat datastores. Further, selecting heartbeat datastores based on accessibility may increase the probability that a master host will have access to the datastore associated with each subordinate host.

In exemplary embodiments, each datastore provides a file system of a particular file system type, such as Network File System (NFS) and/or Virtual Machine File System (VMFS). Management server 230 is configured with a predetermined ranking of file system types and groups 620 the accessible datastores by file system type according to the predetermined ranking. For example, if VMFS is ranked higher than NFS, management server 230 ranks all datastores providing a VMFS file system higher than all datastores providing an NFS file system.

Management server 230 ranks 625 accessible datastores within each file system type group based on the accessibility previously determined 605. In exemplary embodiments, ranking 625 accessible datastores includes discarding datastores associated with an accessibility below a threshold value. The threshold value may be calculated by subtracting a predetermined delta value (e.g., four) from the maximum accessibility determined 605 by management server 230. For example, if management server 230 determines 605 a maximum accessibility of 128 hosts, and the predetermined delta value is four, management server 230 may discard datasources with an accessibility less than or equal to 124 hosts.

Beginning with the highest-ranked accessible datastore, management server 230 selects 630 datastores as the heartbeat datastores for the current host 201 until management server 230 has selected 630 the target quantity of heartbeat datastores. In exemplary embodiments, prior to selecting 630 a datastore, management server 230 determines 635 whether the datastore is associated with or "backed by" a device that backs another datastore that has already been selected. The backing device of a datastore may be one or more storage devices (e.g., a hard drive), computing devices (e.g., NFS servers), and/or any hardware capable of making a datastore accessible to a host 201. If the datastore is backed by a device that also backs an already-selected datastore, management server 230 does not select 630 the datastore and proceeds to the next accessible datastore. If management server 230 has evaluated all accessible datastores but not yet selected 630 the target quantity of datastores for the host, management server 230 may continue by selecting 630 datastores based on the previous grouping 620 and ranking 625, without regard to the predetermined delta value and/or the devices associated with the datastores.

When the target quantity of datastores has been selected 630, management server 230 associates 640 the selected datastores with the host as heartbeat datastores. In exemplary embodiments, associating 640 the datastores with the host includes storing the datastores in association with the host in a host list, which management server 230 transmits to hosts 201 in fault domain 202.

Management server 230 may continue with the next host 201 in fault domain 202 by identifying 610 datastores to which the next host 201 has read-write access. Accordingly, heartbeat datastores may be associated 640 with each host 201 in fault domain 202.

The heartbeat datastores may be selected 630 based at least in part on user preference. The management server 230 receives 602 a selection of preferred heartbeat datastores. In an embodiment, management server 230 identifies 610 only accessible datastores that are included in the selection, such that only preferred datastores may be selected 630 as heartbeat datastores. In another embodiment, management server 230 first attempts to select 630 the target quantity of heartbeat datastores from the preferred datastores. However, if the target quantity of heartbeat datastores has not been selected 630, management server 230 does not select 630 datastores without regard to the predetermined delta value and/or the devices associated with the datastores, as described above. Rather, management server 230 identifies 610 accessible datastores without regard to the preferred datastores and continues to group 620, rank 625, and select 630 datastores, as described above.

In exemplary embodiments, management server 230 responds to changes in datastore availability, datastore accessibility, and/or user preferences. In such embodiments, management server 230 detects 645 a change in preferred datastores or a change in datastore availability. If the change is a change in preferred datastores, management server 230 determines 605 the accessibility of, identifies 610, groups 620, ranks 625, and selects 630 datastores. If the change is a newly available datastore, management server 230 waits for a predetermined duration (e.g., five minutes), enabling hosts 201 to recognize the new datastore, and continues by determining 605 the accessibility of each datastore in cluster 200 and proceeds to identify 610, group 620, rank 625, and select 630 datastores.

Rather than an addition of a newly available datastore, the change may be an impending unavailability of the first datastore. For example, management server 230 may receive from a host 201 and/or from a datastore a notification that the datastore will become unavailable due to removal of the datastore, unmounting of the datastore from a computing device, and/or configuring of the datastore in a maintenance mode. In response to the notification, management server 230 determines 605 the accessibility of each datastore in cluster 200, excluding the datastore that will become unavailable, and proceeds to identify 610, group 620, rank 625, and select 630 datastores.

In exemplary embodiments, management server 230 executes at least a portion of method 600 repeatedly (e.g., periodically, continuously, and/or upon request). For example, as hosts 201 are added to and/or removed from fault domain 202, management server 230 may associate 640 heartbeat datastores with all hosts 201, or with only the added hosts 201, and publish a new host list. The management server 230 may include a version number in each host list and increment the version number with each revision to the host list.

Hosts 201 may store or "cache" the host list as the host list is received and exchange the corresponding version number with other hosts 201. In exemplary embodiments, each host 201 transmits the version number to other hosts 201. When a host 201 receives a version number that is greater than the version number of the host list the host 201 has cached, the host 201 requests and receives the host list from the sender of the version number and caches the received host list. Alternatively, each host 201 may transmit the host list cached by the host 201 to other hosts 201 without first receiving a request. When a host 201 receives a host list with a version number that is greater than the version number of the host list the host 201 has cached, the host 201 caches the received host list. Otherwise, the host 201 may disregard the host list. Such embodiments facilitate propagating updates to the host list throughout fault domain 202. Management server 230 and hosts 201 may exchange software application instance properties (e.g., identifiers of hosts 201 that are compatible with a software application instance and/or host attributes associated with the software application instance), a cluster configuration that defines the operation of hosts 201 (e.g., including an isolation response strategy), and/or any other information relevant to the operation of devices in cluster 202 in a similar manner.

Further, in some embodiments, management server 230 includes a fault domain identifier (ID) in the host list. Hosts 201 in fault domain 202 are configured with an expected fault domain ID and disregard messages and/or host lists that reference a fault domain ID other than the expected fault domain ID. Accordingly, multiple fault domains may reside on a single network and use the same datastores without interference.

In some embodiments, management server 230 receives from a master host an indication of the actual protection state of VMs 142 in fault domain 202. For example, the actual protection state of a VM 142 may be "protected" when the master host is able to acquire an exclusive lock to a datastore-specific protected list referencing the VM 142 and/or to store information about the VM 142 in the datastore-specific protected list and/or the master protected list. If the master host is unable to acquire such an exclusive lock and/or unable to store such information, the actual protection state may be "unprotected." Further, if the VM 142 has been removed from a protected list (e.g., the master protected list or a datastore-specific protected list), the actual protection state may be "not applicable" (N/A), indicating that the VM 142 should not be monitored or restarted on failure. For example, the VM 142 may have been removed from the protected list because a user terminated the VM 142 or moved the VM 142 to a host outside fault domain 202. Such a user action may indicate that the user intends for cluster 200 to ignore the VM 142. Embodiments in which management server 230 receives an indication of actual protection states of VMs 142 enable a single device (e.g., management server 230) to maintain and present a state of hosts 201 within fault domain 202.

The methods described may be performed by computing devices, such as hosts 201 in cluster 200 (shown in FIG. 3). The computing devices communicate with each other through an exchange of messages and/or stored data. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

Exemplary Operating Environment

The monitoring and execution of software application instances in a fault domain as described herein may be performed by a computer or computing device. A computer or computing device may include one or more processors or processing units, system memory, and some form of computer readable media. Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules, or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the disclosure are operative with numerous other general purpose or special purpose computing system environments or configurations. Examples of well known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The operations illustrated and described herein may be implemented as software instructions encoded on a computer-readable medium, in hardware programmed or designed to perform the operations, or both. For example, aspects of the disclosure may be implemented as a system on a chip.

The embodiments illustrated and described herein as well as embodiments not specifically described herein but within the scope of aspects of the disclosure constitute exemplary means for maintaining high availability of software application instances, such as virtual machines.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for maintaining high availability of a plurality of virtual machines in a fault domain, the system comprising:
    a network communication interface configured to receive heartbeat messages from a plurality of hosts executing the virtual machines; and
    a processor coupled to the memory and programmed to:
        associate a datastore with a host, within the plurality of hosts, by grouping the plurality of datastores by file system type and ranking the grouped datastores based on their accessibility scores, wherein the accessibility score is based on 1) quantity of hosts that have access to the datastore or 2) whether the datastore is associated with the same storage device as another datastore;
        determine whether the host is an unreachable host or an inoperative host based on the received heartbeat messages and heartbeat data stored in the datastore; and
        restart a virtual machine that ceases executing on the unreachable host or executed by the inoperative host based on determining that the host is the unreachable host or the inoperative host.

2. The system of claim 1, wherein the processor is further programmed to associate the datastore with the host by discarding a datastore with an accessibility score that is below a threshold value.

3. The system of claim 1, wherein the network communication interface is further configured to receive from a management server a host list that includes a plurality of heartbeat datastores associated with the unreachable host, and the processor is further programmed to determine whether the unreachable host has stored heartbeat data in the datastore by determining whether the unreachable host has stored heartbeat data in any of the heartbeat datastores associated with the unreachable host.

4. The system of claim 1, wherein the network communication interface is further configured to receive a protected virtual machine list identifying a plurality of virtual machines within a fault domain that are to be maintained in an operating state from a management server, and the processor is further programmed to execute a fault domain manager software application as a master host.

5. The system of claim 1, wherein the processor is further programmed to:
    identify a datastore that stores a virtual disk image associated with the virtual machine; and
    restart the virtual machine based further on determining that a file stored in the identified datastore can be exclusively locked.

6. The system of claim 1, wherein the processor is further programmed to:
    monitor a power-on list stored in the datastore by the unreachable host based on determining that the unreachable host has stored heartbeat data in the datastore, wherein the power-on list indicates virtual machines being executed by the unreachable host; and
    restart the virtual machine when the virtual machine does not appear in the power-on list.

7. The system of claim 1, further comprising a second host other than the unreachable host, wherein the processor is programmed to restart the virtual machine by storing execution command data in a datastore that is accessible by the second host, wherein the execution command data instructs the second host to execute the virtual machine.

8. The system of claim 1, wherein the processor is further programmed to:
    transmit a ping message to the unreachable host based on not receiving a heartbeat message from the unreachable host;
    identify the unreachable host as a dead host when no response ping message corresponding to the transmitted ping message is received from the unreachable host; and
    restart the virtual machine based further on identifying the unreachable host as a dead host.

9. A method comprising:
    associating a datastore with a host by grouping a plurality of datastores by file system type and ranking the grouped datastores based on their accessibility scores, wherein the accessibility score is based on 1) quantity of hosts that have access to the datastore or 2) whether the datastore is associated with the same storage device as another datastore;

determining whether the host is an unreachable host or an inoperative host based on a received heartbeat message and heartbeat data stored in the datastore; and restarting a virtual machine that ceases executing on the unreachable host or executed by the inoperative host based on determining that the host is the unreachable host or the inoperative host.

10. The method of claim 9, wherein associating the datastore with the host comprises discarding a datastore with an accessibility score that is below a threshold value.

11. The method of claim 9, further comprising receiving from a management server a host list that includes a plurality of heartbeat datastores associated with the unreachable host, and determining whether the unreachable host has stored heartbeat data in the datastore by determining whether the unreachable host has stored heartbeat data in any of the heartbeat datastores associated with the unreachable host.

12. The method of claim 9, further comprising receiving a protected virtual machine list identifying a plurality of virtual machines within a fault domain that are to be maintained in an operating state from a management server, and executing a fault domain manager software application as a master host.

13. The method of claim 9, further comprising:
identifying a datastore that stores a virtual disk image associated with the virtual machine; and
restarting the virtual machine based further on determining that a file stored in the identified datastore can be exclusively locked.

14. The method of claim 9, further comprising:
monitoring a power-on list stored in the datastore by the unreachable host based on determining that the unreachable host has stored heartbeat data in the datastore, wherein the power-on list indicates virtual machines being executed by the unreachable host; and
restarting the virtual machine when the virtual machine does not appear in the power-on list.

15. The method of claim 9, further comprising restarting the virtual machine by storing execution command data in a datastore that is accessible by a second host, wherein the execution command data instructs the second host to execute the virtual machine.

16. The method of claim 9, further comprising:
transmitting a ping message to the unreachable host based on not receiving a heartbeat message from the unreachable host;
identifying the unreachable host as a dead host when no response ping message corresponding to the transmitted ping message is received from the unreachable host; and
restarting the virtual machine based further on identifying the unreachable host as a dead host.

17. A computer readable non-transitory storage medium storing instructions which when executed by a computer cause the computer to perform a method, the method comprising:
associating a datastore with a host by grouping a plurality of datastores by file system type and ranking the grouped datastores based on their accessibility scores, wherein the accessibility score is based on 1) quantity of hosts that have access to the datastore or 2) whether the datastore is associated with the same storage device as another datastore;

determining whether the host is an unreachable host or an inoperative host based on a received heartbeat message and heartbeat data stored in the datastore; and restarting a virtual machine that ceases executing on the unreachable host or executed by the inoperative host based on determining that the host is the unreachable host or the inoperative host.

18. The computer readable non-transitory storage medium of claim 17, wherein associating the datastore with the host comprises discarding a datastore with an accessibility score that is below a threshold value.

19. The computer readable non-transitory storage medium of claim 17, the method further comprising receiving from a management server a host list that includes a plurality of heartbeat datastores associated with the unreachable host, and determining whether the unreachable host has stored heartbeat data in the datastore by determining whether the unreachable host has stored heartbeat data in any of the heartbeat datastores associated with the unreachable host.

20. The computer readable non-transitory storage medium of claim 17, the method further comprising receiving a protected virtual machine list identifying a plurality of virtual machines within a fault domain that are to be maintained in an operating state from a management server, and executing a fault domain manager software application as a master host.

21. The computer readable non-transitory storage medium of claim 17, the method further comprising:
identifying a datastore that stores a virtual disk image associated with the virtual machine; and
restarting the virtual machine based further on determining that a file stored in the identified datastore can be exclusively locked.

22. The computer readable non-transitory storage medium of claim 17, the method further comprising:
monitoring a power-on list stored in the datastore by the unreachable host based on determining that the unreachable host has stored heartbeat data in the datastore, wherein the power-on list indicates virtual machines being executed by the unreachable host; and
restarting the virtual machine when the virtual machine does not appear in the power-on list.

23. The computer readable non-transitory storage medium of claim 17, the method further comprising further comprising restarting the virtual machine by storing execution command data in a datastore that is accessible by a second host, wherein the execution command data instructs the second host to execute the virtual machine.

24. The computer readable non-transitory storage medium of claim 17, the method further comprising:
transmitting a ping message to the unreachable host based on not receiving a heartbeat message from the unreachable host;
identifying the unreachable host as a dead host when no response ping message corresponding to the transmitted ping message is received from the unreachable host; and
restarting the virtual machine based further on identifying the unreachable host as a dead host.

* * * * *